US012682889B2

(12) United States Patent
Han et al.

(10) Patent No.: US 12,682,889 B2
(45) Date of Patent: Jul. 14, 2026

(54) METHOD, DEVICE, AND PROGRAM FOR PROVIDING MATCHING INFORMATION THROUGH ANALYSIS OF SOUND INFORMATION

(71) Applicant: COCHL INC, Dover, DE (US)

(72) Inventors: Yoonchang Han, Seoul (KR); Jeongsoo Park, Suwon-si (KR); Subin Lee, Seoul (KR); Ilyoung Jeong, Seoul (KR); Hyungui Lim, Seoul (KR); Donmoon Lee, Suwon-si (KR)

(73) Assignee: COCHL INC, Dover, DE (US)

( * ) Notice: Subject to any disclaimer, the term of this patent is extended or adjusted under 35 U.S.C. 154(b) by 176 days.

(21) Appl. No.: 18/510,411

(22) Filed: Nov. 15, 2023

(65) Prior Publication Data

US 2024/0096314 A1     Mar. 21, 2024

Related U.S. Application Data

(63) Continuation of application No. PCT/KR2022/005067, filed on Apr. 7, 2022.

(30) Foreign Application Priority Data

May 28, 2021 (KR) ........................ 10-2021-0069223
Jun. 23, 2021 (KR) ........................ 10-2021-0081297

(51) Int. Cl.
*G10L 15/16* (2006.01)
*G06Q 30/0251* (2023.01)
(Continued)

(52) U.S. Cl.
CPC .............. *G10L 15/16* (2013.01); *G10L 15/22* (2013.01); *G10L 25/78* (2013.01); *G06Q 30/0252* (2013.01); *G10L 2015/226* (2013.01)

(58) Field of Classification Search
CPC ... G10L 15/16; G10L 15/22; G10L 2015/223; G10L 2015/226; G10L 2015/227;
(Continued)

(56) References Cited

U.S. PATENT DOCUMENTS 6,842,767 B1 * 1/2005 Partovi ................. H04L 67/306
709/224
10,594,757 B1 * 3/2020 Shevchenko .......... H04N 7/148
(Continued)

FOREIGN PATENT DOCUMENTS

JP    2004-017200 A    1/2004
JP    6027180 B2    11/2016
(Continued)

OTHER PUBLICATIONS

International Search Report issued in PCT/KR2022/005067; mailed Jul. 6, 2022.
(Continued)

*Primary Examiner* — James S Wozniak
(74) *Attorney, Agent, or Firm* — Studebaker Brackett PLLC

(57) ABSTRACT

Disclosed is a method for providing matching information through the analysis of sound information according to an embodiment of the present invention. The method may include a step for acquiring the sound information, a step for acquiring user feature information on the basis of the sound information, and a step for providing the matching information corresponding to the user feature information.

9 Claims, 6 Drawing Sheets

(51) Int. Cl.
*G10L 15/22* (2006.01)
*G10L 25/78* (2013.01)

(58) Field of Classification Search
CPC .............. G10L 2015/228; G10L 17/22; G06Q 30/0251; G06Q 30/0252
USPC ........................................ 704/232, 270, 275
See application file for complete search history.

(56) References Cited

U.S. PATENT DOCUMENTS

| | | | | |
|---|---|---|---|---|
| 2003/0101060 A1* | 5/2003 | Bickley | ................... | G10L 15/08 704/275 |
| 2015/0026719 A1* | 1/2015 | Menon | ............... | H04N 21/2668 725/34 |
| 2016/0314782 A1* | 10/2016 | Klimanis | .............. | G10L 15/065 |
| 2017/0201779 A1* | 7/2017 | Publicover | ......... | H04N 21/4532 |
| 2017/0323653 A1* | 11/2017 | Hassan al Banna | .... | G10L 25/84 |
| 2019/0171409 A1* | 6/2019 | Boulanger | ............. | H04H 60/12 |
| 2019/0206401 A1* | 7/2019 | Liu | ......................... | G10L 15/22 |
| 2019/0206407 A1* | 7/2019 | Shukla | ................... | G10L 15/24 |
| 2019/0371333 A1 | 12/2019 | Kim | | |
| 2019/0391788 A1* | 12/2019 | Blake | ...................... | G10L 25/54 |
| 2020/0104094 A1* | 4/2020 | White | ...................... | G10L 17/00 |
| 2020/0143802 A1* | 5/2020 | Newell | ................... | G10L 15/30 |
| 2020/0279279 A1* | 9/2020 | Chaudhuri | ............... | G06N 5/04 |
| 2020/0296458 A1* | 9/2020 | Chappell, III | ......... | A61B 5/163 |
| 2021/0352380 A1* | 11/2021 | Duncan | ............. | H04N 21/4884 |
| 2022/0284227 A1* | 9/2022 | Ogrinz | ................. | G06V 40/171 |
| 2022/0351712 A1* | 11/2022 | Aher | ..................... | G10L 13/027 |

FOREIGN PATENT DOCUMENTS

| | | | |
|---|---|---|---|
| JP | 2019-036191 A | 3/2019 |
| JP | 2019-200598 A | 11/2019 |
| KR | 10-2015-0137307 A | 12/2015 |
| KR | 10-2019-0053633 A | 5/2019 |
| KR | 10-2019-0087353 A | 7/2019 |
| KR | 10-2044555 B1 | 12/2019 |
| WO | 2018/180024 A1 | 10/2018 |

OTHER PUBLICATIONS

"Notice of Reasons for Refusal" Office Action issued in JP 2023-570375; mailed by the Japanese Patent Office on Feb. 4, 2025.

* cited by examiner

METHOD, DEVICE, AND PROGRAM FOR PROVIDING MATCHING INFORMATION THROUGH ANALYSIS OF SOUND INFORMATION

CROSS-REFERENCE TO RELATED APPLICATIONS

The present application is a continuation of International Patent Application No. PCT/KR2022/005067, filed on Apr. 7, 2022, which is based upon and claims the benefit of priority to Korean Patent Application Nos. 10-2021-0069223 filed on May 28, 2021, and 10-2021-0081297 filed on Jun. 23, 2021. The disclosures of the above-listed applications are hereby incorporated by reference herein in their entirety.

TECHNICAL FIELD

The present invention relates to a method of providing matching information suitable for a user and, more particularly, to a technique for providing matching information optimized for a user through an analysis of sound information.

BACKGROUND ART

As the use of various types of electronic devices such as smart TVs, smart phones, and tablet PCs is increasing and Internet services are becoming more active, the number of advertisements provided online or through electronic devices is increasing.

For example, advertising methods using an electronic device or an online service include a method of providing an advertisement set by an advertiser in each site in a banner format to all users who visit the site. As a concrete example, recently, an advertisement viewer target who will receive an advertisement online has been set and customized advertisements have been provided to the advertisement viewer target.

As a way of targeting advertisement viewers to provide customized advertisements, subscriber's areas of interest may be determined by obtaining and analyzing information about subscribers online.

Such online advertisements have a limited form of advertisement to collect information about a subscriber when the subscriber accesses a specific site to use a service. In addition, online advertisements are provided based on preset user information including users' areas of interest and thus when a user's areas of interest change, only advertisements related to previously set areas of interest are provided unless the user changes his or her areas of interest, thereby preventing information about the user's new areas of interest from being provided to the user.

Therefore, it is difficult to increase the efficiency of providing advertisements in terms of providing advertisements according to a subscriber's areas of interest when an advertising method of the related art is used. In addition, there may be concerns about a failure to actively cope with users' areas of interest that may change over time with such advertising methods.

RELATED ART LITERATURE

Patent Document

Korean Patent Registration No. 10-2044555

Technical Problem

To address the above-described problems, the present invention is directed to viding matching information more, suitable for a user through an analysis of sound information.

Aspects of the present invention are not limited thereto and other aspects that are not described here will be clearly understood by those of ordinary skill in the art from the following description.

Technical Solution

To address the above-described problems, various embodiments of the present invention provide a method of providing matching information through an analysis of sound information. The method may include obtaining sound information, obtaining user feature information on the basis of the sound information, and providing matching information corresponding to the user feature information.

In an alternative embodiment, the obtaining of the user feature information on the basis of the sound information may include identifying a user or an object through an analysis of the sound information, and generating the user feature information on the basis of the identified user or object.

In an alternative embodiment, the obtaining of the user feature information on the basis of the sound information may include generating activity time information related to a period of time dining which a user does activities in a specific space through the analysis of the sound information, and generating the user feature information on the basis of the activity time information.

In an alternative embodiment, the providing of the matching information corresponding to the user feature information may include providing the matching information on the basis of points in time when a plurality of pieces of user feature information corresponding to a plurality of pieces of sound information obtained for a predetermined time are obtained and a frequency of the plurality of pieces of user feature information.

In an alternative embodiment, the obtaining of the sound information may include preprocessing the obtained sound information, and identifying sound feature information corresponding to the preprocessed sound information, and the sound feature information may include first feature information indicating whether the sound information is related to at least one of linguistic sound or non-linguistic sound and second feature information related to object classification.

In an alternative embodiment, the obtaining of the user feature information on the basis of the sound information may include obtaining the user feature information on the basis of the sound feature information corresponding to the sound information, and the obtaining of the user feature information may include at least one of obtaining user feature information corresponding to the sound information by inputting the sound information into a first sound model, when the sound feature information includes the first feature information indicating that the sound information is related to linguistic sound, or obtaining user feature information corresponding to the sound information by inputting the sound information into a second sound model, when the sound feature information includes the first feature information indicating that the sound information is related to non-linguistic sound.

In an alternative embodiment, the first sound model may include a neural network model trained to analyze sound information related to linguistic sound and identify at least one of text, a subject, or an emotion related to the sound information, the second sound model may include a neural network model trained to analyze sound information related to non-linguistic sound and obtain object identification information or object state information related to the sound information, and the user feature information may include at least one of first user feature information related to at least one of the text, the subject, or the emotion related to the sound information or second user feature information related to the object identification information or the object state information related to the sound information.

In an alternative embodiment, the providing of the matching information corresponding to the user feature information may include, when the obtained user feature information may include the first user feature information and the second user feature information, obtaining correlation information related to a correlation between the first user feature information and the second user feature information, updating the matching information on the basis of the correlation information, and providing the updated matching information.

In an alternative embodiment, the providing of the matching information on the basis of the user feature information may include generating an environmental feature table on the basis of one or more pieces of user feature information each corresponding to one of one or more pieces of sound information obtained at intervals of a predetermined time period, and providing the matching information on the basis of the environmental feature table, and the environmental feature table may include information about statistics of each piece of user feature information obtained at intervals of the predetermined time period.

In an alternative embodiment, the providing of the matching information corresponding to the user feature information may include identifying a first point in time for providing the matching information on the basis of the environmental characteristic table, and providing the matching information at the first point in time.

Another embodiment of the present invention provides an apparatus for providing matching information through an analysis of sound information. The apparatus includes a memory storing one or more instructions, and a processor configured to execute the one or more instructions stored in the memory, and the processor executes the one or more instructions to perform the method of providing matching information through an analysis of sound information.

Another aspect of the present invention provides a computer-readable recording medium. The computer-readable recording medium may provide a method of providing matching information through acoustic information analysis in combination with a computer which is hardware.

Other aspects of the present invention will be apparent from the detailed description and drawings.

Advantageous Effects

According to various embodiments of the present invention, targeted matching information can be provided on the basis of sound information obtained in relation to a user's living environment, thereby maximizing advertising effects.

Effects of the present invention are not limited thereto and other effects that are not described herein will be apparent to those of ordinary skill in the art from the following description.

BEST MODE

Figure 1:
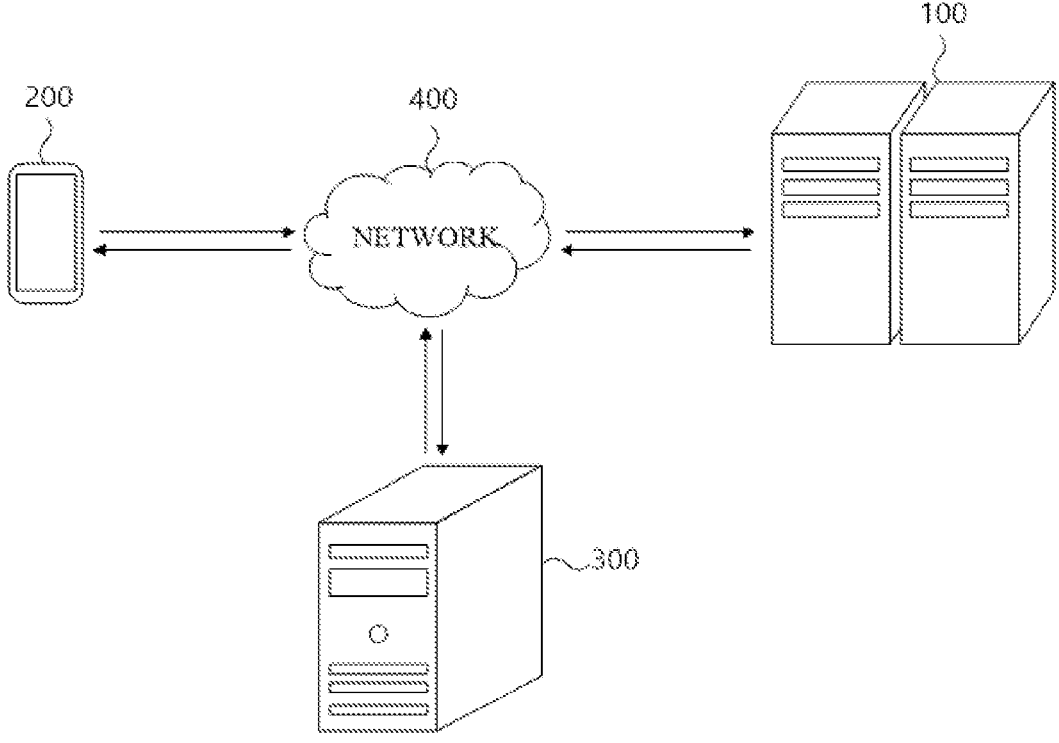
FIG. 1 is a diagram schematically illustrating a system that performs a method of providing matching information through an analysis of sound information according to an embodiment of the present invention.

Hereinafter, various embodiments will be described with reference to the accompanying drawings. In the present specification, various examples are provided to help the understanding of the present invention. However, it will be clear that these embodiments can be implemented without such a detailed description.

The terms "component," "module," "system" and the like, when used herein, refers to a computer-related entity, hardware, firmware, software, a combination of software and hardware, or execution of software. For example, a component may be understood as, but is not limited to, a procedure performed by a processor, a processor, an object, an execution thread, a program, and/or a computer. For example, both an application executed by a computing device and the computing devices may be components. One or more components may reside in a processor and/or an execution thread. One component may be localized in one computer. One component may be distributed between two or more computers. These components may be run from various computer-readable media storing various data structures therein. Components may communicate with each other through local and/or remote processing, for example, according to a signal containing one or more data packets (e.g., data transmitted from a system through a network such as the Internet according to data and/or a signal from one component interacting with another component in a local or distributed system.

In addition, the term "or" is intended to mean inclusive "or" rather than exclusive "or." That is, "X uses A or B" is intended to mean one of natural implicit substitutions unless otherwise specified or contextually clear. That is, "X uses A or B" should be understood to mean that X uses A, X uses B, or X uses both A and B. The term "and/or" when used herein should be understood to refer to and include all possible combinations of one or more of relevant items listed herein.

In addition, "comprise" and/or "comprising" should be understood to mean the presence of a corresponding feature and/or component. However, it will be understood that the terms "comprise" and/or "comprising" do not preclude the presence or addition of one or more other features, components, and/or groups thereof. Each singular form described in the detailed description and claims should be understood to generally mean "one or more" unless otherwise specified or contextually clear as indicating a singular form.

It will be understood by those of ordinary skill in the art that various examples of logical blocks, configurations, modules, circuits, means, logic, and operations of an algo- rithm additionally described below in relation to embodi- ments set forth herein can be implemented by electronic hardware, computer software, or a combination thereof. To clearly indicate the interchangeability of hardware and soft- ware, various examples of components, blocks, configura- tions, means, logic, modules, circuits, and operations have been generally described above in terms of functionalities thereof. Whether to implement such functionality by hard- ware or software depends on specific applications and design limitations imposed on an overall system. It will be obvious that functionalities described in various ways with respect to the specific applications can be implemented by skilled technicians. However, it should not be understood that decisions of such implementation are not within the scope of the present invention.

A description of embodiments set forth herein is provided to help those of ordinary skill in the art use or implement the present invention. It will be apparent to those of ordinary skill in the art that various modifications can be made in these embodiments. General principles defined herein may apply to other embodiments without departing from the scope of the present invention. Therefore, the present inven- tion is not limited to embodiments set forth herein. The present invention should be interpreted within a broadest range consistent with principles and novel features described herein.

As used herein, the term "computer" should be under- stood to mean various types of hardware devices, including at least one processor, and may be understood to include a software component operating in a corresponding hard device according to an embodiment. For example, a com- puter may be understood to include, but is not limited to, a smart phone, a tablet PC, a desktop computer, a laptop computer, and a user client and an application running on each device.

Hereinafter, embodiments of the present invention will be described in detail with reference to the accompanying drawings.

Operations described herein will be described as being performed by a computer, but a subject of each of the operations is not limited thereto and at least some of the operations may be performed by different devices according to an embodiment.

Here, in a method of providing matching information through an analysis of sound information according to various embodiments of the present invention, matching information optimized for each user may be provided on the basis of various types of sound information obtained in the real life of each of a plurality of users. For example, the matching information may be information related to an advertisement. That is, the providing of the matching infor- mation optimized for each user may be understood as providing an efficient advertisement, i.e., optimal advertise- ment information, for raising each user's purchasing desire. That is, in the method of providing matching information through an analysis of sound information according to the present invention, customized advertisement information may be provided to a user by analyzing various types of sound information obtained in a living space of the user. Accordingly, advertisements can be selectively exposed only to potential customers or target customers who are likely to be interested in such advertisements and thus it is possible for an advertiser to obtain effects of significantly reducing advertisement costs and maximizing advertisement effects. In addition, consumers can be provided with only advertisements satisfying their interests and needs and thus an effect of increasing the convenience of information retrieval can be achieved.

FIG. 1 is a diagram schematically illustrating a system that performs a method of providing matching information through an analysis of sound information according to an embodiment of the present invention. As shown in FIG. 1, the system that performs a method of providing matching information through an analysis of sound information according to the embodiment of the present invention may include a server 100 that provides matching information through an analysis of sound information, a user terminal 200, and an external server 300.

Here, the system for providing matching information through an analysis of sound information shown in FIG. 1 is only an example and thus components thereof are not limited to those shown in the embodiment of FIG. 1 and other components may be added thereto or some of the components may be modified or omitted as necessary.

In an embodiment, the server 100 that provides matching information through an analysis of sound information may obtain sound information and analyze the obtained sound information to provide optimal matching information. That is, the server 100 that provides matching information through an analysis of sound information may obtain various types of sound information related to a user's real life and analyze the obtained sound information through a sound model to identify information related to a preference of the user and provide optimal matching information to the user.

According to the embodiment, examples of the server 100 that provides matching information through an analysis of sound information may include a server implemented by an application programming interface (API). For example, the user terminal 200 may obtain sound information and analyze the sound information, and provide the server 100 with a result of identifying the sound information through the API. Here, the result of identifying the sound information may be understood as, for example, a feature related to the analysis of the sound information. As a concrete example, the result of identifying the sound information may be a spectrogram obtained by performing a short-time Fourier transform (STFT) on the sound information. The spectrogram may be a visualization of sound or waves to identify the sound or waves, and may be a combination of the features of a waveform and a spectrum. The spectrogram may represent a change of amplitude versus changes in a time axis and a frequency axis using a change in a print density or a color to be displayed.

As another example, the result of identifying the sound information may include a mel-spectrogram obtained with respect to the spectrogram through a mel-filter hank. Gen- erally, a part of the human cochlea that vibrates may vary according to a frequency of voice data. The human cochlea detects a change of a frequency well in low-frequency bands but does not detect a change of a frequency well in high- frequency hands. Accordingly, a mel-spectrogram may be obtained from a spectrogram using the mel-filter bank to obtain a result of identifying voice data, which is similar to that obtained using the human cochlea. That is, the mel-filter bank may be understood as applying a narrow filter hank to a low-frequency band and a wide filter bank to a high- frequency band. In other words, the user terminal 200 may obtain a mel-spectrogram by applying the mel-filter bank to the spectrogram to identify sound information in a way similar to an operation of the human cochlea. That is, the mel-spectrogram may include a frequency component reflecting human auditory characteristics.

The server 100 may provide optimal matching information to a user on the basis of the result of identifying the sound information obtained from the user terminal 200. In this case, the server 100 may receive only the result of identifying the sound information (e.g., the spectrogram or mel spectrogram that is a basis for prediction of the user's preference) from the user terminal 200, thereby preventing user privacy issues that may be raised due to the collection of sound information.

In an embodiment, a sound model (e.g., an artificial intelligence model) may include one or more network functions, and the one or more network functions may consist of a set of interconnected computing units that may be referred to generally as "nodes." Such "nodes" may be referred to as "neurons." The one or more network functions may each include at least one node. Nodes (or neurons) constituting the one or more network functions may be connected to each other by one or more "links."

In the artificial intelligence model, one or more nodes connected through a link may form a relative relationship between an input node and an output node. The concept of the input node and the output node is a relative concept, and thus a node serving as an output node for one node may serve as an input node for another node and vice versa. As described above, a relationship between an input node and an output de may be formed with respect to a link. One or more output nodes may be connected to one input node through a link, and vice versa.

In a relationship between an input node and an output node connected through one link, a value of the output node may be determined on the basis of data input to the input node. Here, a node connecting the input node and the output node may be assigned a weight. The weight may be variable and may be changed by a user or an algorithm to allow an artificial intelligence model to perform a desired function. For example, when each of one or more input nodes is connected to one output value through one link, a value of the output node may be determined on the basis of values input to the input nodes connected to the output node and a weight set for the link corresponding to each of the input nodes.

As described above, in the artificial intelligence model, one or more nodes are connected to each other through one or more links to form a relationship between an input node and an output node in the artificial intelligence model. Features of the artificial intelligence model may be determined by the number of nodes and the number of links in the artificial intelligence model, a correlation between the nodes and the links, and weights assigned to the links. For example, when the number of nodes and the number of links are the same and there are two artificial intelligence models for which different weights are assigned to links, the two artificial intelligence models may be identified as different from each other.

Some nodes constituting an artificial intelligence model may form a layer on the basis of the distances thereto from an initial input node. For example, a set of nodes spaced a distance of n from the initial input node may constitute an $n^{th}$ layer. A distance to a node from the initial input node may be defined by a minimum number of links that should be passed to reach the node from the initial input node. However, the above definition of the layer is only an example provided to describe the layer and thus degrees of layers in the artificial intelligence model may be defined differently from that described above. For example, layers of nodes may be defined by distances from a final output node.

The initial input node may be understood one or more nodes to which data is directly input without using a link in relation to other nodes among the nodes in the artificial intelligence model. Alternatively, the initial input node may be understood as nodes that do not include other input nodes connected through a link in the relationship between nodes with respect to the link in an artificial intelligence model network. Similarly, the final output node may be understood as one or more nodes that do not include an output node in relation to other nodes among the nodes in the artificial intelligence model. Hidden nodes may be understood as nodes of an artificial intelligence model that are neither the initial input node nor the final output node. In an artificial intelligence model according to an embodiment of the present invention, the number of nodes in an input layer may be greater than that of nodes in a hidden layer close to an output layer, and the number of nodes decreases in a direction from the input layer to the hidden layer.

The artificial intelligence model may include one or more hidden layers. An output of a previous layer and an output of a neighboring hidden node may be input to a hidden node in the hidden layer. The number of hidden nodes in each hidden layer may be the same or may be different. The number of nodes in the input layer may be determined on the basis of the number of data fields in input data and may be the same as or different from the number of hidden nodes. Input data input to the input layer may be calculated by the hidden node of the hidden layer and output by a fully connected layer (FCL) that is an output layer.

In various embodiments, an artificial intelligence model may perform supervised learning using, as training data, multiple pieces of sound information and specific information corresponding to each of the multiple pieces of sound information. However, embodiments are not limited to thereto and various learning methods may be applied.

Here, supervised learning may be understood generally as a method of generating training data by labeling specific data and information related to the specific data and performing learning using the training data, i.e., a method of generating training data by labeling two pieces of data that are in a causal relationship with each other and performing learning using the generated training data.

In an embodiment, the server 100 that provides matching information through an analysis of sound information may determine whether to stop learning using verification data when learning one or more network functions is performed for a predetermined epoch or more. The predetermined epoch may be part of a total learning goal epoch.

The verification data may be at least a part of the labeled training data. That is, the server 100 that provides matching information through an analysis of sound information may train an artificial intelligence model with the training data, and identify whether an effect of training the artificial intelligence model reaches a predetermined level or more using the verification data after the training of the artificial intelligence model is iterated for the predetermined epoch or more. For example, when training is performed using 100 pieces of training data and a target number of iterations of training is 10, the server 100 that provides matching information through an analysis of sound information may perform ten iterations of training, i.e., a predetermined epoch, perform three iterations of training using ten pieces of verification data, and determine that further training is meaningless and stop the training when a rate of change of outputs of the artificial intelligence model is below a pre-determined level for the three iterations of training.

That is, the verification data may be used to determine whether to stop the training based on whether an effect of epoch-specific training is above or below the predetermined level in iterative training of the artificial intelligence model. The training data, the number of pieces of the verification data, and the number of iterations described above are only examples and thus the present invention is not limited thereto.

The server 100 that provides matching information through an analysis of sound information may generate an artificial intelligence model by testing the performance of one or more network functions using test data and determining whether to activate the one or more network functions. The test data may be used to verify the performance of the artificial intelligence model, and may be at least a part of the training data. For example, 70% of the training data may be used to train the artificial intelligence model (i.e., training for adjusting a weight to output a result similar to a label), and 30% thereof may be used as test data for verifying the performance of the artificial intelligence model. The server 100 that provides matching information through an analysis of sound information may input the test data to the trained artificial intelligence model and measure errors to determine whether to activate the artificial intelligence model according to whether the performance of the trained artificial intelligence model is greater than or equal to a predetermined performance level.

The server 100 that provides matching information through an analysis of sound information may verify the performance of the trained artificial intelligence model using the test data, and activate the trained artificial intelligence model to be used in other applications when the performance thereof is greater than or equal to a predetermined reference level.

In addition, the server 100 that provides matching information through an analysis of sound information may deactivate and discard the trained artificial intelligence model when the performance thereof is below the predetermined reference level. For example, the server 100 may identify the performance of a generated artificial intelligence model on the basis of factors such as accuracy, precision, and recall. The performance evaluation criteria described above are only examples and the present invention is not limited thereto. According to an embodiment of the present invention, the server 100 that calculates an optimal stimulus position may generate a plurality of artificial intelligence models by independently training the artificial intelligence models, evaluate the performances thereof, and use only an artificial intelligence model whose performance level is greater than or equal to a certain performance level. However, the present invention is not limited thereto.

Throughout the present specification, an arithmetic operation model, a neural network, a network function, and a neural network may be understood as having the same meaning (hereinafter referred to together as a neural network). The data structure may be understood as including a neural network. The data structure, including the neural network, may be stored in a computer-readable medium. The data structure including the neural network may further include data input to the neural network, a weight of the neural network, a hyper-parameter of the neural network, data obtained from the neural network, an activation function associated with each node or layer of the neural network, and a loss function for training the neural network. The data structure including the neural network may include some of the components described above. That is, the data structure including the neural network may further include data input to the neural network, a weight of the neural network, a hyper-parameter of the neural network, data obtained from the neural network, an activation function associated with each node or layer of the neural network, a loss function for training the neural network, or a combination thereof. In addition to the above-described components, the data structure including the neural networks may include any other information for determining characteristics of the neural network. In addition, the data structure may include various types of data used or generated in an arithmetic process of the neural network and is not limited to the above description. A computer-readable medium may include a computer-readable recording medium and/or a computer-readable transmission medium. The neural network may include a set of computational units that are generally referred to as nodes and are connected to one another. Such nodes may be referred to as neurons. The neural network includes at least one or more nodes.

According to an embodiment of the present invention, the server 100 that provides matching information through an analysis of sound information may be a server that provides a cloud computing service. More specifically, the server 100 that provides matching information through an analysis of sound information may be a server that provides a cloud computing service that is a type of Internet-based computing for processing information using a computer connected through the Internet other than a user's computer. The cloud computing service may be a service for storing data in the Internet and allowing a user to use desired data or a program regardless of time and place by connecting to the Internet without storing the desired data or program in the user's computer, and die data stored in the Internet can be easily shared and delivered through simple manipulation and clicking. In addition, the cloud computing service may be a service for allowing a desired task to be performed using functions of an application program provided on a web without additionally installing a program and allowing several persons to perform a task at the same time while sharing a document, as well as simply storing data in a server on the Internet. The cloud computing service may be implemented as at least one of Infrastructure as a Service (IaaS), Platform as a Service (PaaS), Software as a Service (SaaS), a virtual machine-based cloud server, or a container-based cloud server. That is, the server 100 that provides matching information through an analysis of sound information according to the present invention may be implemented in the form of at least one of the above-described cloud computing services. The cloud computing services described above are only examples, and the present invention may include a platform for constructing a cloud computing service.

In various embodiments, the server 100 that provides matching information through an analysis of sound information may be connected to the user terminal 200 through a network 400, generate and provide a sound model that analyzes sound information, and provide optimal matching information corresponding to each user on the basis of information obtained by analyzing sound information (e.g., user feature information) using the sound model.

Here, the network 400 may be a connection structure for the exchange of information between nodes such as terminals and servers. Examples of the network 400 may include a local area network (LAN), a wide area network (WAN), a world wide web (WWW), a wired/wireless data communication network, a telephone network, a wired/wireless television communication network, etc.

Examples of the wireless data communication network include, but are not limited to, 3G, 4G, 5G, 3rd Generation Partnership Project (3GPP), 5th Generation Partnership Project (5GPP), Long-Term Evolution (LTE), World Interoperability for Microwave Access (WiMAX), Wi-Fi, the Internet, a local area network (LAN), a wireless LAN, a wide area network (WAN), a personal area network (PAN), radio frequency (RE), a Bluetooth network, a near-field communication (NEC) network, a satellite broadcast network, an analog broadcast network, a digital multimedia broadcasting (DMB) network, etc.

In an embodiment, the user terminal 200 may be connected to the server 100, which provides matching information through an analysis of sound information through the network 400, provide the server 100 with a plurality of pieces of sound information (e.g., linguistic sound information or non-linguistic sound information), and receive various types of information (e.g., user feature information corresponding to the sound information, matching information corresponding to the user feature information, etc.) in response to the provided sound information.

Here, the user terminal 200 is a wireless communication device capable of securing portability and mobility, and may include, but is not limited to, handheld-based wireless communication devices such as a navigation device, a personal communication system (PCS), a global system for mobile communications (GSM), a personal digital cellular (PDC), a personal handyphone system (PHS), a personal digital assistant (PDA), an International mobile telecommunication (IMT)-2000, a code division multiple access (CDMA)-2000, a W-code division multiple access (W-CDMA), a wireless broadband Internet (WiBro) terminal, a smartphone, a smartpad, and a tablet PC. For example, the user terminal 200 may further include an artificial intelligence (AI) speaker, an AI TV, etc., that provides various functions, such as a function of listening to music and an information retrieval function, through interaction with users on the basis of hot words.

In an embodiment, the user terminal 200 may include a first user terminal 210 and a second user terminal 220. User terminals (the first user terminal 210 and the second user terminal 220) may have a mechanism for communication with each other or other entities through the network 400, and be understood as an arbitrary type of entity in a system that provides matching information through an analysis of sound information. For example, the first user terminal 210 may include an arbitrary terminal related to a user receiving matching information. The second user terminal 220 may include an arbitrary terminal related to an advertiser for registration of matching information. The user terminal 200 includes a display and thus is capable of receiving an input from a user and providing an arbitrary type of output to the user.

In an embodiment, the external server 300 may be connected to the server 100, which provides matching information through sound information, through the network 400, provide various types of information data necessary for the server 100 to analyze sound information using an artificial intelligence model, or receive, store and manage result data derived by analyzing the sound information using the artificial intelligence model. For example, the external server 300 may be, but is not limited to, a storage server provided separately outside the server 100 that provides matching information through sound information. A hardware configuration of the server 100 that provides matching information through an analysis of sound information will be described with reference to FIG. 2 below.

Figure 2:
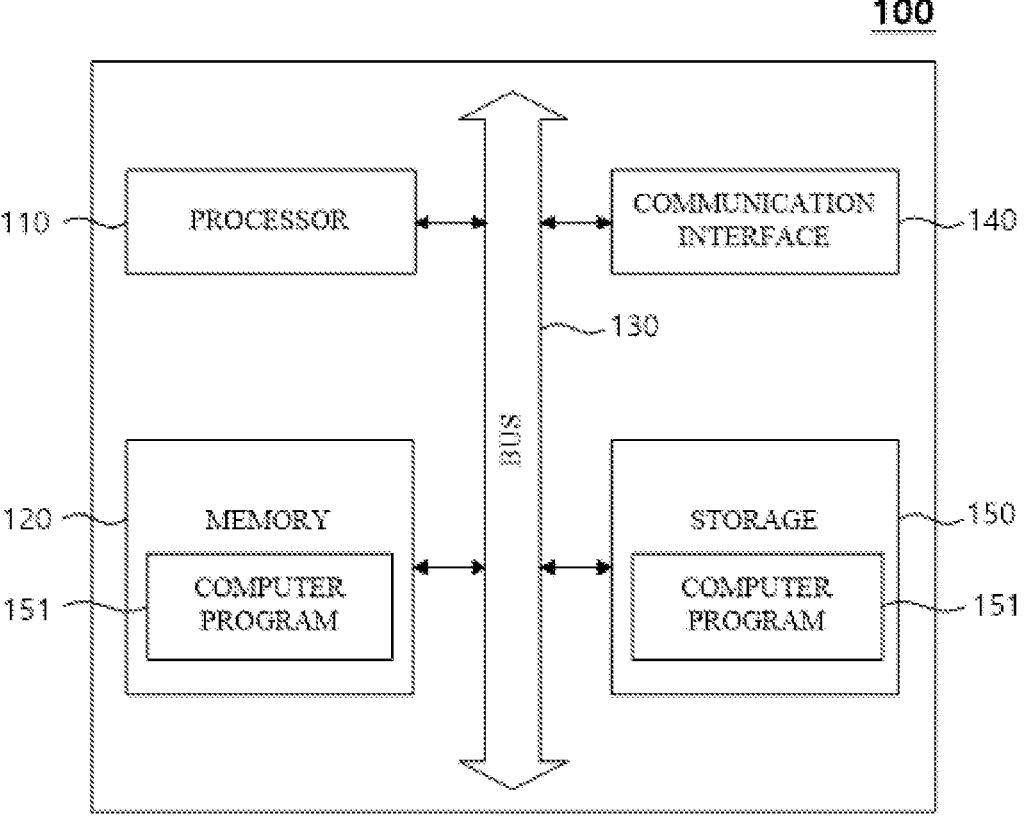
FIG. 2 is a diagram illustrating a hardware configuration of a server that provides matching information through an analysis of sound information according to an embodiment of the present invention.

FIG. 2 is a diagram illustrating a hardware configuration of a server that provides matching information through an analysis of sound information according to an embodiment of the present invention.

Referring to FIG. 2, a server 100, which calculates an optimal stimulus position, according to an embodiment of the present invention (hereinafter referred to as the "server 100") may include at least one processor 110, a memory 120 configured to load therein a computer program 151 to be executed by the at least one processor 110, a bus 130, a communication interface 140, and a storage 150 storing the computer program 151. Here, FIG. 2 illustrates only components related to the embodiment of the present invention. Therefore, it will be apparent to those of ordinary skill in the art that other general-purpose components may be further provided in addition to the components illustrated in FIG. 2.

The processor 110 controls overall operations of the components of the server 100. The processor 110 may include a central processing unit (CPU), a microprocessor unit (MPU), a microcontroller unit (MCU), a graphics processing unit (GPU), or any type of processor well known in the technical field of the present invention.

The processor 110 may read the computer program stored in the memory 120 and perform data for an artificial intelligence model according to an embodiment of the present invention. According to an embodiment of the present invention, the processor 110 may perform an operation of training a neural network. The at least one processor 110 may perform arithmetic operations for training a neural network, e.g., processing input data for training through deep learning (DL), extracting features from the input data, calculating an error value, and updating a weight of the neural network using backpropagation.

At least one of a CPU, a GPGPU, and a TPU of the at least one processor 110 may process learning of a network function. For example, both the CPU and the GPGPU may process the learning of the network function and data classification using the network function. In an embodiment of the present invention, processors of a plurality of computing devices may be used together to perform the learning of the network function and data classification using the network function. A computer program performed by a computing device according to an embodiment of the present invention may be a program executable by the CPU, the GPGPU or the TPU.

In the present specification, the network function may be used interchangeably with an artificial neural network and a neural network. In this specification, the network function may include at least one neural network, and in this case, an output of the network function may form an ensemble with an output of the at least one neural network.

The processor 110 may read a computer program stored in the memory 120 and provide a sound model according to an embodiment of the present invention. According to an embodiment of the present invention, the processor 110 may obtain user feature information corresponding to sound information. According to an embodiment of the present invention, the processor 110 may perform calculation to train a sound network.

According to an embodiment of the present invention, the processor 110 may generally control overall operations of the server 100. The processor 110 may process signals, data, information, and the like that are input or output through the components described above or may execute an application program stored in the memory 120 to provide appropriate information or functions to a user or a user terminal or process the information or functions.

The processor 110 may perform an operation on at least one application or program for performing methods according to embodiments of the present invention, and the server 100 may include one or more processors.

In various embodiments, the processor 110 may further include a random access memory (RAM) (not shown) and a read-only memory (ROM) (not shown) for temporarily and/or permanently storing signals (or data) processed in the processor 110. The processor 110 may be in the form of a system-on-chip (SoC) including at least one of a graphics processor, a RAM, and a ROM.

The memory 120 stores various types of data, instructions, and/or information. The memory 120 may load the computer program 151 from the storage 150 to perform methods/operations according to various embodiments of the present invention. When the computer program 151 is loaded in the memory 120, the processor 110 may execute one or more instructions constituting the computer program 151 to perform the methods/operations. The memory 120 may be embodied as a volatile memory such as a RAM but the technical scope of the present invention is not limited thereto.

The bus 130 provides a communication function between the components of the server 100. The bus 130 may be embodied as various types of buses such as an address bus, a data bus, and a control bus.

The communication interface 140 supports wired/wireless Internet communication of the server 100. The communication interface 140 may support various communication methods other than Internet communication. To this end, the communication interface 140 may include a communication module well known in the technical field of the present invention, in some embodiments, the communication interface 140 may be omitted.

The storage 150 may store the computer program 151 non-temporarily. When a process of providing matching information through an analysis of sound information is performed through the server 100, the storage 150 may store various types of information necessary to provide matching information through an analysis of sound information.

The storage 150 may include a non-volatile memory, such as a ROM, an erasable programmable ROM (EPROM), an electrically erasable programmable ROM (EEPROM) or a flash memory, a hard disk, a detachable disk, or any type of computer-readable recording medium well known in the technical field to which the present invention pertains.

The computer program 151 may include one or more instructions causing the processor 110 to perform methods/operations according to various embodiments of the present invention when the computer program 151 is loaded in the memory 120. That is, the processor 110 may execute the one or more instructions to perform the method/operations according to various embodiments of the present invention.

In an embodiment, the computer program 151 may include one or more instructions for performing a method of providing matching information through an analysis of sound information, the method including obtaining sound information, obtaining user feature information on the basis of the sound information, and providing matching information corresponding to the user feature information.

The operations of the method or an algorithm described above in connection with embodiments of the present invention may be implemented directly by hardware, a software module executed by hardware, or a combination thereof. The software module may be stored in a RAM, a ROM, an EPROM, an EEPROM, a flash memory, a hard disk, a detachable disk, a CD-ROM, or any type of computer-readable recording medium well known in the technical field to which the present invention pertains.

Components of the present invention may be embodied in the form of a program (or an application) and stored in a medium to be executed in combination with a computer which is hardware. The components of the present invention may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors. A method of providing matching information through an analysis of sound information, which is performed by the server 100, will be described with reference to FIGS. 3 to 6 below.

Figure 3:
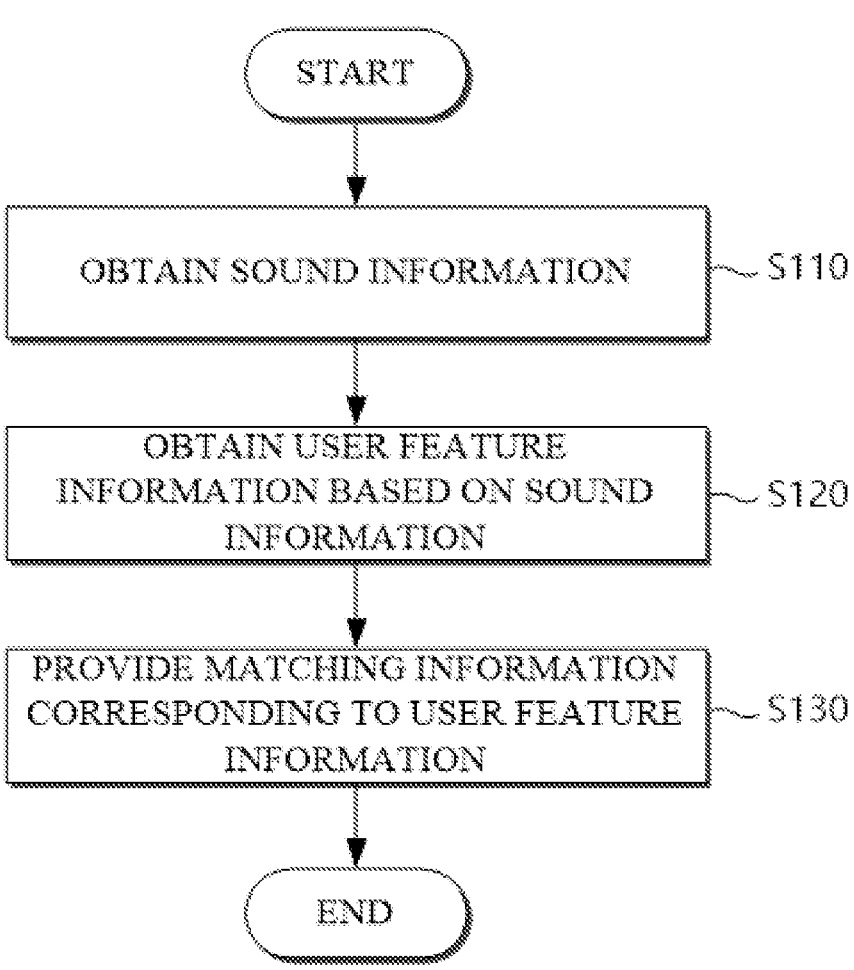
FIG. 3 is a flowchart of an example of a method of providing matching information through an analysis of sound information according to an embodiment of the present invention.

FIG. 3 is a flowchart of an example of a method of providing matching information through an analysis of sound information according to an embodiment of the present invention.

According to an embodiment of the present invention, in operation S110, the server 100 may obtain sound information. According to an embodiment, the sound information may be obtained through the user terminal 200 related to a user. Examples of the user terminal 200 related to the user may include various types of handheld-based wireless communication devices, such as a smartphone, a smartpad, and a tablet PC, or electronic devices (e.g., devices capable of receiving sound information through a microphone) located in a specific space.

According to an embodiment, the obtaining of the sound information may be receiving or loading sound information stored in a memory. Alternatively, the obtaining of the sound information may be receiving or loading the sound information from another storage medium, another server, or a separate processing module included in the same server, based on wired/wireless communication means.

In an additional embodiment of the present invention, the obtaining of the sound information may be performed based on whether a user is located in a specific space (e.g., the user's activity space). Specifically, a sensor module may be provided in the specific space related to the user's activity. That is, it is possible to identify whether the user is located in the specific space through the sensor module provided in the specific space. For example, unique information of the user at a long distance may be recognized through radio waves using radio-frequency identification (RFID) technology that is a type of short range communication. For example, the user may own a card or a mobile terminal that includes an RFID module, Identification (ID) information of the user (e.g., a personal ID, identification code, or the like of the user registered in a server management server) may be recorded in the user's own RFID module. The RFID module may identify the user's own RFID module to identify whether the user is located in the specific space. The sensor module may employ various techniques (e.g., short range communication technology such as Bluetooth) for transmitting or receiving the user's unique information in a contact/non-contact manner, as well as the RFID technology. The sensor module may include a biometric data ID module that identifies a user's biometric data (voice, fingerprint, face) conjunction with a microphone, a touchpad, a camera module or the like. In an additional embodiment, whether the user is located in the specific space may be identified through sound information related to the user's speech. Specifically, voice information related to the user's speech may be recognized as a starting word, and additional sound information generated in the specific space at a point in time when the voice information is recognized may be obtained.

The server 100 may identify whether the user is located in the specific space using the sensor module or sound related to the user's speech as described above. When it is determined that the user is located in the specific space, the server 100 may obtain generated sound information on the basis of the point in time.

In other words, sound information related to the specific space may not be obtained when the user is not located in the specific space and may be obtained only when the user is located in the specific space, thereby minimizing power consumption.

According to an embodiment of the present invention, the obtaining of the sound information may include preprocessing the obtained sound information and identifying sound feature information corresponding to the preprocessed sound information.

In an embodiment, the preprocessing of the sound information may be preprocessing for improving a recognition rate of the sound information. For example, the preprocessing may include preprocessing for removing noise from the sound information. Specifically, the server 100 may standardize the size of a signal included in the sound information on the basis of a comparison of the size of the signal with the size of a predetermined reference signal. The server 100 may perform preprocessing to increase the size of the signal when the size of the signal included in the obtained sound information is smaller than that of the predetermined reference signal and to reduce the size of the signal (i.e., not to be clipped) when the size of the signal is larger than or equal to than that of the predetermined reference signal. The noise removal described above is only an example and thus the present invention is not limited thereto.

According to another embodiment of the present invention, the preprocessing of the sound information may include preprocessing for analyzing a waveform of the signal included in the sound information and amplifying sound (i.e., non-linguistic sound) other than speeches. Specifically, the server 100 may analyze the frequencies of various types of sound included in the sound information and expand sound related to at least one specific frequency.

For example, the server 100 may classify various types of sound included in the sound information using a machine learning algorithm, such as a Supporting Vector Machine (SVM), to identify the various types of sound information, and amplify specific sound through a sound amplification algorithm corresponding to each of the types of sound of different frequencies. The above-described sound amplification algorithm is only an example and thus the present invention is not limited thereto.

In other words, according to the present invention, preprocessing may be performed to amplify non-linguistic sound included in the sound information. For example, according to the present invention, sound information on which an analysis performed to identify a user's features (or to provide optimal matching information to the user) is based may include linguistic sound information and non-linguistic sound information. In an embodiment, Lite non-linguistic sound information may provide more meaningful information for analyzing the user's features than the linguistic sound information.

For example, when the server 100 obtains sound information including the sound of a companion animal (e.g., a dog), the server 100 may amplify sound information related to the non-linguistic sound to improve a recognition rate of "dog sound" that is non-linguistic sound information.

As another example, when the server 100 obtains sound information related to a user's cough sound (i.e., non-linguistic sound information), the server 100 may amplify sound information related to the non-linguistic sound to improve a recognition rate of "human cough sound" that is non-linguistic sound information.

In other words, more suitable matching information may be provided to a user by performing preprocessing to amplify non-linguistic sound information that provides information meaningful for identification of the user's features.

In addition, the server 100 may identify sound feature information corresponding to the preprocessed sound information. Here, the sound feature information may include first feature information about whether the sound information is related to at least one of linguistic sound and non-linguistic sound, and second feature information related to object classification.

The first feature information may include information about whether the sound information is linguistic sound or non-linguistic sound. For example, the first feature information corresponding to first sound information may include information indicating that the first sound information is related to linguistic sound, and the first feature information corresponding to second sound information may include information indicating that the second sound information is related to non-linguistic sound.

The second feature information may include information about the number of objects in the sound information. For example, the second feature information corresponding to the first sound information may include information indicating that three users' speech is included in the first sound information, and the second feature information corresponding to the second sound information may include information indicating that sound related to an operation of a washing machine and sound related to a cat's cry are included in the second sound information. In an embodiment, the first feature information and the second feature information that correspond to the sound information may be identified through a first sound model and a second sound model, which are to be described below.

That is, the server 100 may preprocess obtained sound information and identify sound feature information corresponding to the preprocessed sound information. Here, as described above, the sound feature information includes information (i.e., the first feature information) about whether the sound information corresponding thereto is related to linguistic sound or non-linguistic sound, and information (i.e., the second feature information) about the number of objects in the sound information and thus may provide convenience during the analysis of the sound information to be described below.

According to an embodiment of the present invention, in operation S120, the server 100 may obtain user feature information on the basis of the sound information. In an embodiment, the obtaining of the user feature information may include identifying a user or object through an analysis of the sound information and generating the user feature information on the basis of the identified user or object.

Specifically, when the server 100 obtains the sound information, a user or object corresponding to the sound information may be obtained through an analysis of the sound information. For example, the server 100 may analyze the first sound information and identify that the first sound information is sound corresponding to a first user. As another example, the server 100 may analyze the second sound information and identify that the second sound information is sound corresponding to a cleaner. As another example, the server 100 may analyze third sound information and identify that the third sound information includes sound corresponding to a second user and sound related to a washing machine. The above descriptions of the first sound information to the third sound information are only examples and thus the present invention is not limited thereto.

In addition, the server 100 may generate user feature information on the basis of the identified user or object corresponding to the sound information. Here, the user feature information is information on which the provision of matching information is based, and may be text, a subject, or an emotion related to the sound information, object identification information, or object state information.

For example, when the first sound information is identified as sound corresponding to the first user, the server 100 may identify user information matching the first user and generate user feature information indicating that the first user is a 26-year-old woman. As another example, when the second sound information is identified as sound corresponding to a cleaner of A brand, the server 100 may generate user feature information indicating that a user uses the cleaner of A brand from the second sound information. As another example, when the third sound information is identified as sound that corresponds to the second user and is related to a washing machine of B brand, the server 100 may generate user feature information indicating that the second user is a 40-year-old man and uses the washing machine of B brand. The first sound information to the third sound information and the user feature information corresponding thereto described above are only examples and thus the present invention is not limited thereto.

That is, the server 100 may generate user feature information related to a user on the basis of the user or an object that is identified through the analysis of the sound information. The user feature information may be information indicating the user's interests, taste, characteristics, or the like.

In an embodiment, the obtaining of the user feature information may include generating activity time information related to a time during which the user does activities in a specific space through an analysis of sound information, and generating user feature information on the basis of the activity time information. Specifically, the server 100 may generate activity time information related to a time during which the user does activities in the specific space through an analysis of sound information obtained in the specific space.

In an embodiment, the server 100 may obtain information about whether the user is located in the specific space from sound information related to the user's speech. As a concrete example, the server 100 may identify voice related to the user's speech as a starting word, and determine that the user has entered the specific space on the basis of a point in time when the voice has been recognized and determine that the user is not located in the specific area when the voice related to the user's speech is not included in sound information obtained in the specific space and the size of the obtained sound information is less than or equal to a predetermined reference value. In addition, the server 100 may generate activity time information related to a time during which the user does activities in the specific space on the basis of each determination point in time. That is, the server 100 may generate activity time information related to the user by identifying whether the user is located in the specific space, based on the sound information related to the user's speech.

In another embodiment, the server 100 may obtain information about whether the user is located in the specific space based on the size of the obtained sound information. As a concrete example, the server 100 may identify a point in time when a size of sound information obtained continuously in the specific space is greater than or equal to a predetermined reference value and determine that the user has entered the specific space at the identified point in time, and may identify a point in time when a size of sound information obtained in the specific space is less than the predetermined reference value and determine that the user is not located in the specific space at the identified point in time. In addition, the server 100 may generate activity time information related to a time during which the user does activities in the specific space on the basis of each determination point in time. That is, the server 100 may identify the size of sound information generated in the specific space, identify whether the user is located in the specific space on the basis of the size, and generate activity time information related to the user.

In another embodiment, the server 100 may obtain information about whether the user is located in the specific space on the basis of specific starting sound. Here, the specific starting sound may be sound related to the user's entry into and exit from the specific space. For example, the starting sound may be sound related to opening/closing sound of a front door. That is, the server 100 may determine that the user is located in the space on the basis of sound information related to the opening of a door lock from the outside using a password. The server 100 may determine that the user is not located in the space on the basis of sound information related to the opening of the door lock from the inside using the password. In addition, the server 100 may generate activity time information related to a time during which the user does activities in the specific area on the basis of each determination point in time. That is, the server 100 may generate activity time information related to the user by identifying whether the user is located in the specific space on the basis of starting sound generated in the specific space.

As described above, according to various embodiments, the server 100 may generate activity time information related to a time during which the user does activities in the specific space. For example, the server 100 may generate activity time information indicating that a first user's activity time in a specific space (e.g., a residential space) is 18 hours out of 24 hours (e.g., the first user is located in the space from 12 a.m. to 6 p.m.). As another example, the server 100 may generate activity time information indicating that a second user's activity time in the specific space is 6 hours per day (e.g., the second user is located in the space from 12 a.m. to 6 a.m.). The above-described activity time information corresponding to each user is only an example and thus the present invention is not limited thereto.

In addition, the server 100 may generate user feature information on the basis of the activity time information. As a concrete example, the server 100 may generate user feature information indicating that the first user has done many activities in the residential space on the basis of the activity time information indicating that the first user's activity time in the specific space (e.g., the residential space) is 18 hours out of 24 hours. For example, the server 100 may identify that the first user has stayed longer in the residential space on the basis of the first user's activity time information and generate user feature information indicating that the first user is related to "housewife" or "homeworker." In an additional embodiment, the server 100 may infer a user's job more particularly from a combination of the activity time information and information obtained by analyzing the sound information, in this case, the user's features may be specified more particularly, thereby improving the accuracy of matching information to be provided.

As another example, the server 100 may generate user feature information indicating that the second user spends less time doing activities in a specific space, e.g., a residential space, on the basis of activity time information indicating that the second user's activity time in the specific space is 6 hours a day. The activity time information of each user and the user feature information corresponding thereto described above are only examples and thus the present invention is not limited thereto.

According to another embodiment of the present invention, the obtaining of the user feature information may include obtaining user feature information on the basis of sound feature information corresponding to the sound information. Here, the sound feature information may include first feature information about whether the sound information is related to at least one of linguistic sound and non-linguistic sound, and second feature information related to object classification.

Specifically, the obtaining of the user feature information may include at least one of obtaining sound feature information corresponding to the sound information by inputting the sound information to a first sound model when the sound feature information includes the first feature information indicating that the sound feature information corresponds to linguistic sound or obtaining sound feature information corresponding to the sound information by inputting the sound information to a second sound model when the sound feature information includes the first feature information indicating that the sound feature information corresponds to non-linguistic sound.

In an embodiment, the first sound model may be a neural network model trained to analyze sound information related to linguistic sound to identify at least one of text, a subject, or an emotion related to the sound information, According to an embodiment of the present invention, the first sound model is a voice recognition model that outputs text information corresponding to voice information (i.e., linguistic sound) related to a user's speech included in sound information when the voice is input thereto, and may include one or more network functions pre-learned using training data. That is, the first sound model may include a voice recognition model that converts voice information related to the user's speech into text information. For example, the voice recognition model may process voice information related to the user's speech as an input and output text (e.g., "We're out of dog food") corresponding thereto. The voice information and the text corresponding thereto described above are only examples and thus the present invention is not limited thereto.

The first sound model may include a text analysis model that identifies context through a natural language processing analysis of output text information corresponding to voice information to identify a subject or emotion contained in the voice information.

In an embodiment, the text analysis model may identify important keywords through a semantic analysis of text information using a natural language processing neural network (i.e., the text analysis model) to identify a subject. For example, in the case of text information related to "We're out of dog food," the text analysis model may identify the subject of this sentence as "out of food." The text information and the subject corresponding thereto described above are only examples and thus the present invention is not limited thereto.

In an embodiment, the text analysis model may perform an operation on text information through a natural language processing neural network and output an analysis value according to each of various intention groups. The various intention groups may be obtained by dividing a sentence including text into specific intentions according to a predetermined criterion. Here, the natural language processing artificial neural network may calculate connection weights and output the intention groups as output nodes, when the text information is input data. Here, the connection weights may be weights of an input, an output, and a forget gate used in a long short-term memory (LSTM) method or weights of gates used in a recurrent neural network (RNN). Accordingly, the first sound model may calculate an analysis value of text information corresponding to each of the intention groups. Here, the analysis value may be understood as a probability that the text information corresponds to one intention group. In an additional embodiment, the first sound model may further include an emotion analysis model that outputs an analysis value of an emotion through voice analysis according to a change in the pitch of sound. That is, the first sound model may include the voice recognition model that outputs text information corresponding to a user's voice information, the text analysis model that identifies the subject of a sentence through natural language processing analysis of the text information, and the emotion analysis model that identifies the user's emotions through voice analysis according to a change in the pitch of sound. Accordingly, the first sound model may output information about text, a subject, or an emotion related to sound information including the user's speech, based on the sound information.

In an embodiment, the second sound model may be a neural network model trained to obtain object identification information and object state information related to the sound information by analyzing sound information related to non-linguistic sound.

According to an embodiment of the present invention, the second sound model may be implemented through a dimension reduction network function among the dimension reduction network function and a dimension restoration network function that are learned to output output data similar to input data by the server 100. That is, the second sound model can be implemented through the dimensionality reduction network function (i.e., encoder) part of the autoencoder on which learning has been completed.

In an embodiment, the server 100 may train the autoencoder by an unsupervised learning method. Specifically, the server MO may train the dimension reduction network function (e.g., an encoder) and the dimension restoration network function (e.g., a decoder) of the autoencoder to output output data similar to input data. Specifically, only key feature data (or features) of sound information that is input in an encoding process through the dimension reduction network function may be learned through a hidden layer, and remaining information may be discarded. In this case, output data of the hidden layer in a decoding process through the dimension restoration network function may be a value approximating the input data (i.e., the sound information) rather than a perfect copy value. That is, the server 100 may train the autoencoder by adjusting a weight such that the output data and the input data become substantially the same.

The autoencoder may be a type of neural network for outputting output data similar to input data. The auto encoder may include at least one hidden layer, and an odd number of hidden layers may be disposed between an input layer and an output layer. The number of nodes of each layer may be reduced from the number of nodes of an input layer to the number of nodes of a bottleneck layer (encoding), i.e., an intermediate layer, and expanded from the number of nodes of the bottleneck layer to be symmetrical to a reduction of the number of nodes of an output layer (symmetric to the input layer). The number of input layers and the number of output layers may correspond to the number of items of input data remaining after input data is preprocessed. In a structure of the autoencoder, the number of nodes of a hidden layer included in the encoder may decrease as the distance between the hidden layer and the input layer increases. When the number of nodes of the bottleneck layer (a layer having a smallest number of nodes and located between the encoder and the decoder) is extremely small, a sufficient amount of information cannot be transmitted and thus the number of nodes of the bottleneck layer may be maintained greater than or equal to a certain number (e.g., half of or more than the half the number of input layers).

The server 100 may input a training data set, which includes a plurality of pieces of training data tagged with object information, to the trained dimension reduction network function, and store output object-specific feature data to be matched with the tagged object information. Specifically, the server 100 may input a first training data subset tagged with first object information (e.g., a dog) to the dimension reduction network function to obtain feature data of a first object for training data included in the first training data subset. The obtained feature data may be represented by vectors. In this case, the output feature data corresponding to the plurality of pieces of training data included in the first training data subset is output using training data related to the first object and thus may be located relatively closely in a vector space. The server 100 may store the first object information (i.e., the dog) to be matched with the feature data related to the first object represented by vectors. The dimension reduction network function of the trained autoencoder may be trained to extract features to facilitate the restoration of the input data by the dimension restoration network function. Therefore, as the second sound model is implemented through the dimension reduction network function of the trained autoencoder, features (i.e., sound style of each object) may be extracted to facilitate the restoration of the input data (e.g., sound information).

As an additional example, a plurality of pieces of training data included in each second training data set tagged with second object information (e.g., a cat) may be converted into feature data through the dimension reduction network function and the feature data may be displayed in the vector space. In this case, the feature data is output through training data related to the second object information (i.e., the cat) and thus may be located relatively closely in the vector space. In this case, the feature data corresponding to the second object information may be displayed in a vector space different from that in which the feature data corresponding to the first object information is located.

That is, when sound information generated in a specific space (e.g., a residential space) is input to the dimension reduction network function of the second sound model through a training process as described above, features corresponding to the sound information may be extracted by performing an operation on the sound information using the dimension reduction network function. In this case, the second sound model may evaluate a similarity between sound styles by comparing the distances between regions in which features corresponding to the sound information are displayed and object-specific feature data in the vector space, and obtain object identification information or object state information corresponding to the sound information on the basis of the evaluation of the similarity.

Specifically, the second sound model may obtain first feature information by performing an operation on first sound information, which is received from a first user terminal, using the dimension reduction network function. In this case, the second sound model may obtain object identification information or object state information corresponding to the first sound information on the basis of the locations of the first feature information and object-specific feature data recorded previously in the vector space through learning.

As a concrete example, object identification information indicating that the first sound information is related to a "washing machine of A brand" may be obtained on the basis of a space of a first object (e.g., the washing machine of A brand) closest to the first feature information in the vector space.

As another example, object state information indicating that first sound information is related to "human cough sound" may be obtained on the basis of a space of a second object (e.g., human cough sound) closest to the first feature information vector space. The object identification information and the object state information described above are only examples and thus the present invention is not limited thereto.

Figure 4:
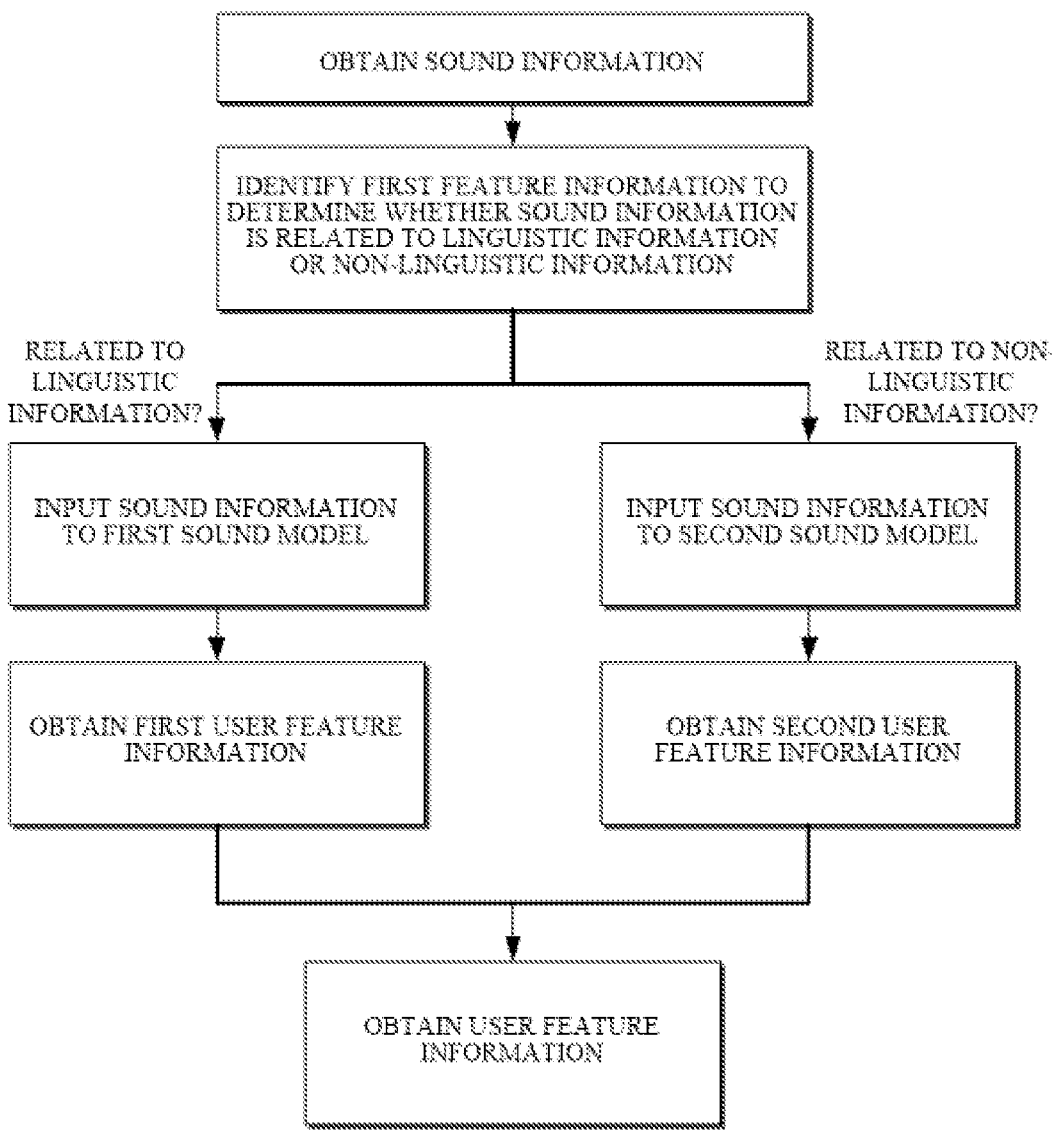
FIG. 4 is a diagram illustrating a process of obtaining user feature information on the basis of sound information according to an embodiment of the present invention.

Referring to FIG. 4, when sound information is obtained, the server 100 may identify whether the sound information is related to linguistic sound or non-linguistic sound on the basis of the first feature information. When the sound information corresponds to linguistic sound, the server 100 may identify text, a subject or an emotion corresponding to the sound information using a first sound model, and obtain first user feature information on the basis of this information. When the sound information corresponds to non-linguistic sound, the server 100 may obtain object identification information or object state information corresponding to the sound information using a second sound model, and obtain second user feature information on the basis of the object identification information or the object state information. In other words, the first user feature information related to text, a subject or an emotion corresponding to linguistic sound may be obtained, and the second user feature information related to object identification information or object state information corresponding to non-linguistic sound may be obtained. That is, user feature information according to the present invention may include first user feature information and second user feature information that are obtained according to whether sound information includes linguistic sound or non-linguistic sound.

According to another embodiment of the present invention, the obtaining of the user feature information may include obtaining user feature information on the basis of sound feature information corresponding to the sound information. Here, the sound feature information may include second feature information related to object classification. The second feature information may include information about the number of objects in the sound information. For example, the second feature information corresponding to the first sound information may include information indicating that three users' speech is included in the first sound information, and the second feature information corresponding to the second sound information may include information indicating that sound related to an operation of a washing machine and sound related to a cat's cry are included in the second sound information.

Specifically, the server 100 may obtain the user feature information on the basis of the second feature information. For example, when it is identified from the second feature information that the sound information includes multiple users' speech, the server 100 may obtain user feature information indicating that multiple users live in a specific space. In an embodiment, the server 100 may detect a change in the number of users in a specific space in each time zone through second feature information of sound information obtained in each time zone, and generate user feature information corresponding thereto. That is, the server 100 may generate user feature information by identifying users' activity patterns or life patterns in the specific space on the basis of the second feature information.

In an embodiment of the present invention, in operation S130, the server 100 may provide matching information corresponding to the user feature information. For example, the matching information may be information related to an advertisement. That is, the providing of the matching information may be understood as providing an efficient advertisement, i.e., optimal advertisement information, for raising each user's purchasing desire.

Figure 6:
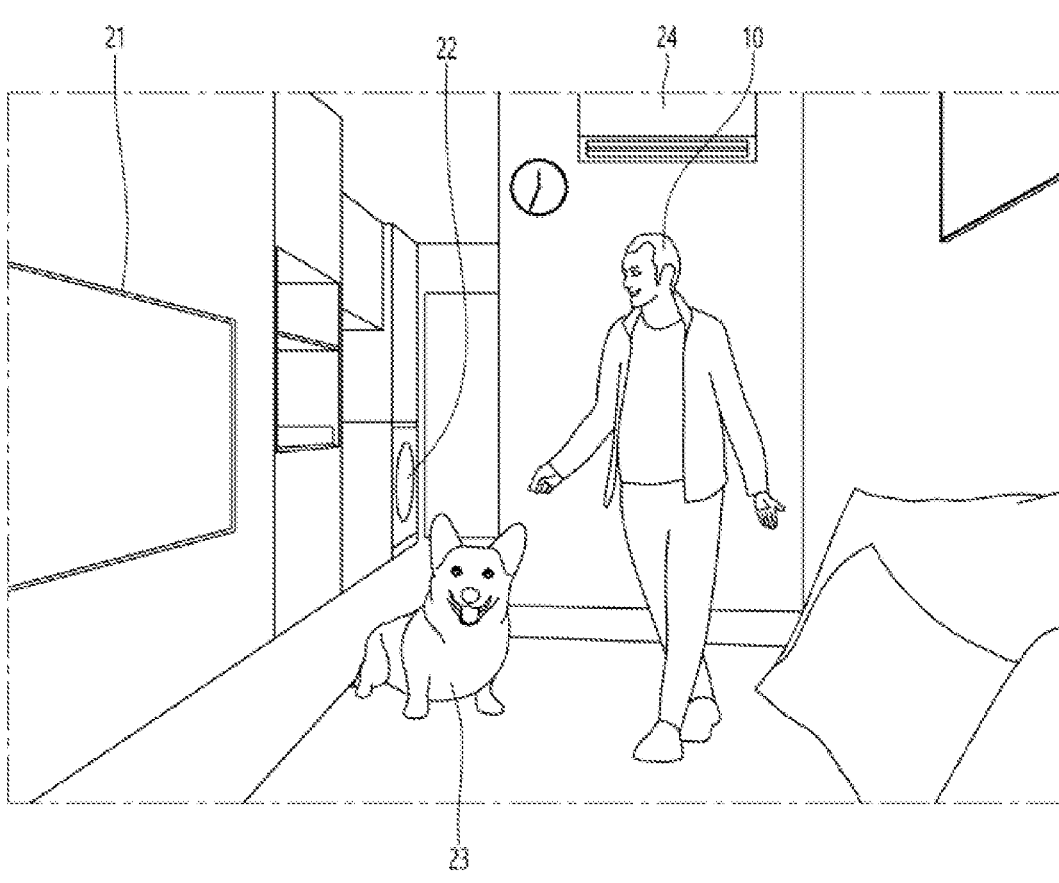
FIG. 6 is a diagram for describing a process of obtaining various types of sound information in a space in which a user is located and a method of obtaining matching information corresponding to sound information according to an embodiment of the present invention

As a concrete example, referring to FIG. 6, when user feature information obtained based on sound information related to a specific space includes second user feature information related to the operation of a washing machine of B brand 22, the server 100 may provide a user 10 with matching information related to a dryer of B brand. As another example, when second user feature information related to the operation of an air conditioner of C brand 24 is obtained in a measurement space, the server 100 may provide the user 10 with matching information related to summer-related products (an umbrella, travel, etc.). The user feature information described above is only an example and thus the present invention is not limited thereto.

In an embodiment, the providing of the matching information corresponding to the user feature information may include providing the matching information on the basis of points in time when a plurality of pieces of user feature information corresponding to a plurality of pieces of sound information are obtained for a predetermined time and frequencies of the plurality of pieces of user feature information. In this case, the predetermined time may be, for example, one day (i.e., 24 hours). In other words, the server 100 may provide the matching information on the basis of a point which each of a plurality of pieces of user feature information corresponding to a plurality of pieces of sound information is obtained for 24 hours and frequencies of the plurality of pieces of user feature information.

For example, when the same type of user feature information is obtained continuously at the same point in time (or the same time zone) at intervals of 24 hours, the server 100 provides matching information at the point in time. For example, when user feature information related to the operation of a washing machine of A brand is obtained at the same point in time (e.g., 7 p.m.) every day, the server 100 may provide matching information related to a dryer of A brand at 8 p.m. when washing is completed on the basis of the user feature information.

For example, when a specific keyword is uttered by a user more than a predetermined number of times (e.g., three times) at intervals of 24 hours, the server 100 may provide matching information corresponding to the keyword. As a concrete example, when a keyword "dog food" is uttered by the user three or more times during the day, the server 100 may provide matching information corresponding to dog food. The points in time when the user feature information is obtained, the number of times that the user feature information is obtained, and the matching information corresponding thereto described above are only examples and thus the present invention is not limited thereto.

That is, the server 100 may record the number of times that a specific keyword is uttered, points in time when the specific keyword is uttered, etc., identify features related to the user based on the records, and provide matching information on the basis of the identified features. In this case, matching information suitable for the user may be provided at a more appropriate point in time, thereby maximizing an advertisement effect.

According to another embodiment of the present invention, the providing of the matching information corresponding to the user feature information may include obtaining correlation information related to a correlation between first user feature information and second user feature information when the user feature information includes the first user feature information and the second user feature information, updating the matching information on the basis of the correlation information, and providing the updated matching information. Here, the first user feature information may be information related to the user's features obtained through linguistic sound, and the second user feature information may be information related to the user's features obtained through non-linguistic sound. That is, user feature information corresponding to linguistic sound and non-linguistic sound that correspond to sound information may be obtained. In this case, the server 100 may update the matching information on the basis of correlation information between obtained pieces of user feature information. Here, the correlation information may be information about a correlation between the linguistic sound and the non-linguistic sound. The updating of the matching information may be performed to further increase an advertising effect through the matching information. For example, the updating of the matching information may increase the number of items of matching information to be exposed or be related to an additional discount event applied to the matching information.

More specifically, the sound information may include linguistic sound and non-linguistic sound. In this case, the first user feature information related to text, a subject, or an emotion may be obtained using the first sound model in response to the linguistic sound. In addition, the second user feature information related to object identification information and object state information may be obtained using the second sound model in response to non-linguistic sound. The server 100 may obtain correlation information between the first user feature information and the second user feature information. For example, the correlation information may be information representing a correlation between pieces of user feature information using numerical values. For example, when the first user feature information includes information indicating that a "dryer" is a subject and the second user feature information includes information related to the use of a dryer of A brand, the server 100 may determine that a correlation between the first user feature information and the second user feature information is very high and thus generate correlation information corresponding to a value of "98." As another example, when the first user feature information includes information indicating that a "dryer" is a subject and the second user feature information includes information related to the use of a washing machine of B brand, the server 100 may determine that a correlation between the first user feature information and the second user feature information is relatively high and thus generate correlation information corresponding to a value of "85." As another example, when the first user feature information includes information indicating that a "cleaner" is a subject and the second user feature information includes information related to a cat's cry, the server 100 may determine that a correlation between the first user feature information and the second user feature information is very low and thus generate correlation information corresponding to a value of "7." The user feature information and the correlation information described above are only examples and thus the present invention is not limited thereto.

When the correlation information is greater than or equal to a predetermined value, the server 100 may update the matching information and provide the updated matching information to the user.

As a more concrete example, a user's speech related to linguistic sounds (e.g., "The dryer doesn't work," first user feature information) and dryer sound that is non-linguistic sound information (i.e., second user characteristic information) may be obtained from the sound information. In this case, the predetermined value may be 90, and the correlation information between the first user feature information and the second user feature information may be 98. In this case, the server 100 may identify that the correlation information between the first user feature information and the second user feature information is greater than or equal to the predetermined value and update the matching information. That is, when both linguistic sound and non-linguistic sound information that are highly related to each other are obtained from sound information, the server 100 may determine that the user is more interested in the corresponding object and thus update the matching information. For example, the server 100 may update the matching information to include information about dryers of other companies in addition to the dryer of A brand to provide the user with more diverse information on the object. As another example, the server 100 may update the matching information to include event information related to a discount method for the purchase of the driver of A brand. The updating of the matching described above is only an example and thus the present invention is not limited thereto.

Figure 5:
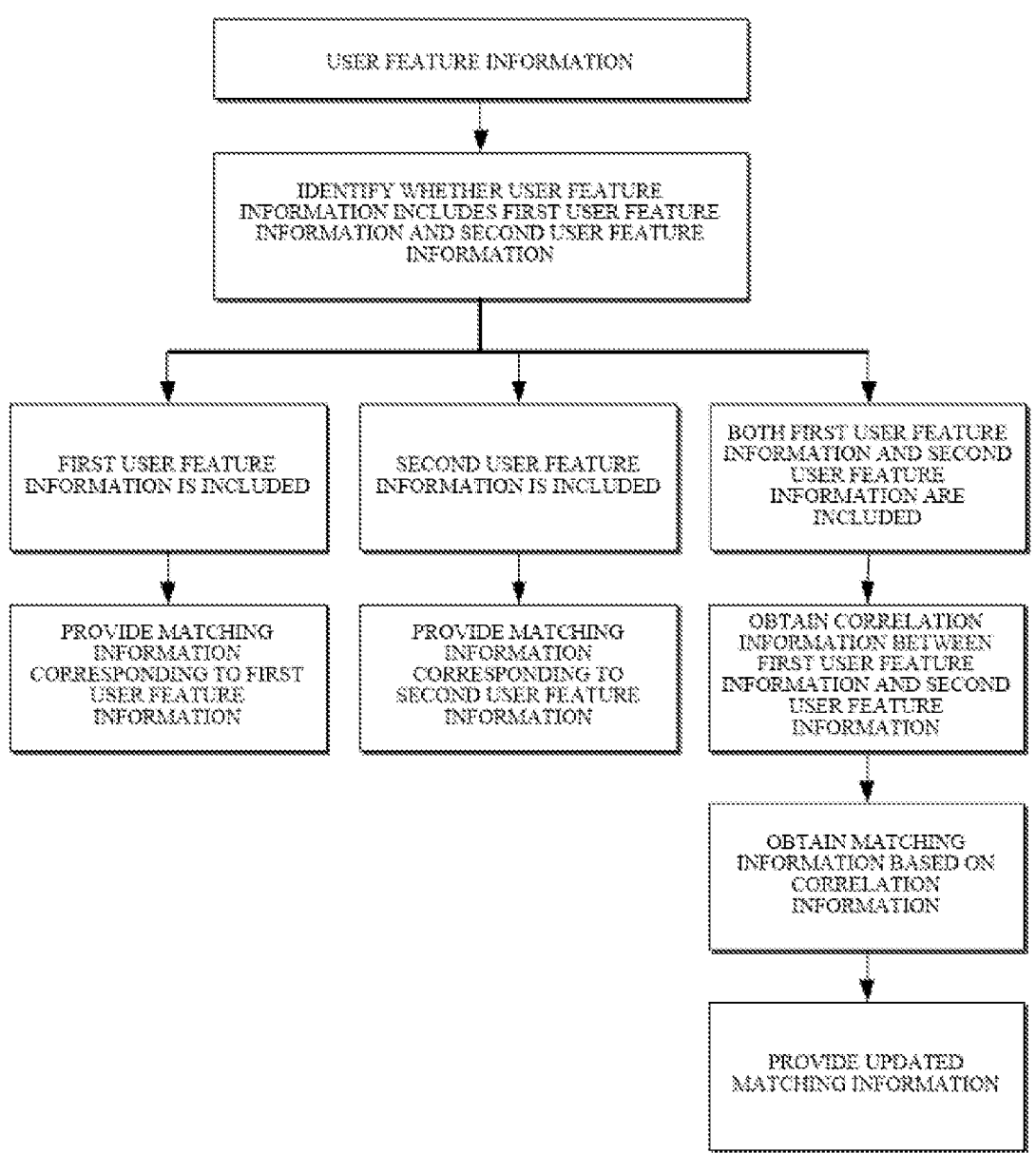
FIG. 5 is a diagram illustrating a process of providing matching information on the basis of user feature information according to an embodiment of the present invention.

Referring to FIG. 5, when user feature information is obtained, the server 100 may identify whether the user feature information includes first user feature information and second user feature information. In an embodiment, when user feature information obtained to correspond to sound information includes first user feature information, the server 100 may provide matching information corresponding to the first user feature information. As a concrete example, referring to FIG. 6, when first user feature information indicating that the user 10 spoke about a subject related to "dog treats" is obtained on the basis of sound information (e.g., a user's speech), the server 100 may provide matching information related to "dog treats." The first user feature information and the matching information described above are only examples and thus the present invention is not limited thereto.

When user feature information obtained to correspond to sound information includes second user feature information, the server 100 may provide matching information corresponding to the second user feature information. As a concrete example, referring to FIG. 6, when second user feature information indicating that a dog 23 that is a companion animal is located in a specific space is obtained on the basis of sound information (e.g., a dog barking), the server 100 may provide various types of matching information related to dogs, such as dog treats, dog food, dog toys, or dog clothes. As another example, when second user feature information about a user's unhealthy state is obtained on the basis of sound information (e.g., the user's cough sound), the server 100 may provide various types of matching information related to the promotion of the user's health, such as cold medicine, porridge, tea, or health supplements. The second user feature information and the matching information described above are only examples and thus the present invention is not limited thereto.

When the user feature information obtained to correspond to the sound information includes both the first user feature information and the second user feature information, the server 100 may obtain correlation information between the first user feature information and the second user feature information and update the matching information based on the correlation information. In addition, the server 100 may provide the updated matching information.

In other words, because the obtaining of both linguistic sound and non-linguistic sound that are related to each other proves that the user's interest is high, the server 100 may provide matching information, to which a large amount of information for decision-making or vent information about additional discounts related to the purchase of objects is reflected, to increase a possibility of the user's purchase. That is, optimal matching information can be provided by predicting the user's interest on the basis of the correlation information between the linguistic sound and the non-linguistic sound and providing matching information corresponding thereto. Thus, matching information can be provided differentially according to the user's interest, thereby maximizing a purchase conversion possibility.

According to an embodiment of the present invention, the providing of the matching information on the basis of the user feature information may include generating an environmental feature table on the basis of one or more pieces of user feature information corresponding to one or more pieces of sound information obtained at intervals of a predetermined time period, and providing matching information on the basis of the environmental feature table. The environmental feature table may be information about statistics of the one or more pieces of user feature information obtained at intervals of the predetermined time period. In an embodiment, the predetermined time period may be 24 hours.

In other words, the server 100 may generate an environmental feature table regarding statistics of user feature information obtained in units of time slots at intervals of 24 hours, and provide matching information on the basis of the environmental feature table.

As a concrete example, statistics of user feature information obtained in units of time slots may be observed through the environmental feature table, and matching information related to groceries or interior goods may be provided to users who stay longer at home. In addition, for example, the server 100 may provide matching information related to new content to users who spend a lot of time watching a TV 21 at home. As another example, matching information related to health supplements or matching information related to unmanned laundry services may be provided to users who spend less time at home.

In an embodiment, the providing of the matching information corresponding to user feature information may include identifying a first point in time for providing matching information on the basis of the environmental feature table, and providing the matching information the first point in time. The first point in time may be understood as an optimal point in time for providing matching information to a corresponding user. That is, a user's activity routine in a specific space may be identified through the environmental feature table and optimal matching information may be provided at each point in time.

For example, when the environmental feature table shows that the sound of a washing machine is periodically identified in a first time slot (8 p.m.), matching information related to a fabric softener or a dryer may be provided in the first time slot.

As another example, when the environmental feature table shows that the sound of a cleaner is periodically identified in a second time zone (2 p.m.), matching information related to a wireless cleaner or a wet mop cleaner may be provided in the second time zone.

That is, the server 100 may provide appropriate matching information at a specific activity time point to maximize the effect of an advertisement. Based on various embodiments as described above, the server 100 may provide targeted matching information based on sound information obtained in relation to the user's living environment to maximize an advertising effect.

The operations of the method or an algorithm described above in connection with embodiments of the present invention may be implemented directly by hardware, a software module executed by hardware, or a combination thereof. The software module may be stored in a RAM, a ROM, an EPROM, an EEPROM, a flash memory, a hard disk, a detachable disk, a CD-ROM, or any type of computer-readable recording medium well known in the technical field to which the present invention pertains.

Components of the present invention may be embodied in the form of a program (or an application) and stored in a medium to be executed in combination with a computer which is hardware. The components of the present invention may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors.

While embodiments of the present invention have been described above with reference to the accompanying drawings, it will be obvious to those of ordinary skill in the art that the present invention may be embodied in many different forms without departing from the technical spirit or essential features thereof. Therefore, it should be understood that the embodiments described above are provided to give examples in all aspects and are not for purposes of limitation.

MODES OF THE INVENTION

Modes of the present invention are as described above in the best mode for implementing the present invention described above.

INDUSTRIAL APPLICABILITY

The present invention is applicable in the field of services for providing matching information through an analysis of sound information.

The invention claimed is:

1. A method performed by a computing device, a user terminal, and a sensor, comprising:

obtaining, by the user terminal, sound information;

generating, by the user terminal, a spectrogram or a mel-spectrogram of the sound information by analyzing of the sound information;

identifying, by the sensor that is located in a living space of a user, whether the user is located in a specific space that is the living space of the user, by recognizing radio waves transmitted from a radio-frequency identification (RFID) module of the user terminal;

identifying, by the computing device, whether the user is located in the specific space, based on sensing information received from the sensor;

in response to an identification that the user is located in the specific space, obtaining, by the computing device, the spectrogram or the mel-spectrogram of the sound information from the user terminal;

obtaining, by the computing device, user feature information, based on the spectrogram or the mel-spectrogram of the sound information; and providing, by the computing device, matching information corresponding to the user feature information, to one or more of the user terminals, wherein the matching information comprises user-specific advertisement information, wherein the providing of the matching information comprises:

generating an environmental feature table, based on one or more pieces of user feature information each corresponding to one of one or more pieces of the spectrogram or the mel-spectrogram of the sound information, that has been continuously obtained in the living space of the user in each time zone at intervals of a predetermined time period; and providing the matching information, based on the environmental feature table, wherein the environmental feature table comprises information on statistics of each piece of user feature information obtained at the intervals of the predetermined time period, and wherein the providing of the matching information further comprises:

identifying a first point in time for providing the matching information, based on the environmental feature table, wherein the first point in time is a time point when a specific activity is performed in each time zone, and the matching information includes the user-specific advertisement information related to the specific activity; and providing the matching information at the first point in time.

2. The method of claim 1, wherein the obtaining of the user feature information comprises:

identifying the user or an object through an analysis of the sound information; and generating the user feature information, based on the identified user or object.

3. The method of claim 1, wherein the obtaining of the user feature information comprises:

generating activity time information related to a period of time during which the user does activities in the specific space through an analysis of the sound information; and generating the user feature information, based on the activity time information.

4. The method of claim 1, wherein the providing of the matching information comprises:

providing the matching information, based on points in time, when a plurality of pieces of user feature information corresponding to a plurality of pieces of sound information obtained for a predetermined time are obtained and a frequency of the plurality of pieces of user feature information.

5. The method of claim 1, wherein the obtaining of the sound information comprises:

preprocessing the obtained sound information; and identifying sound feature information corresponding to the preprocessed sound information, and wherein the sound feature information comprises:

first feature information indicating whether the sound information is related to at least one of linguistic sound or non-linguistic sound; and second feature information related to object classification.

6. The method of claim 5, wherein the obtaining of the user feature information comprises:

obtaining the user feature information, based on the sound feature information corresponding to the sound information, and wherein the obtaining of the user feature information further comprises at least one of:

obtaining the user feature information corresponding to the sound information by inputting the sound information into a first sound model, when the sound feature information includes the first feature information indicating that the sound information is related to linguistic sound; and obtaining the user feature information corresponding to the sound information by inputting the sound information into a second sound model, when the sound feature information includes the first feature information indicating that the sound information is related to non-linguistic sound.

7. The method of claim 6, wherein the first sound model comprises:

a neural network model trained to analyze sound information related to linguistic sound and identify at least one of text, a subject, or an emotion related to the sound information, wherein the second sound model comprises:

a neural network model trained to analyze sound information related to non-linguistic sound and obtain object identification information or object state information related to the sound information, and wherein the user feature information comprises:

at least one of first user feature information related to at least one of the text, the subject, or the emotion related to the sound information or second user feature information related to the object identification information or the object state information related to the sound information.

8. The method of claim 7, wherein the providing of the matching information comprises:

when the obtained user feature information comprises the first user feature information and the second user feature information, obtaining correlation information related to a correlation between the first user feature information and the second user feature information;

updating the matching information, based on the correlation information; and providing the updated matching information.

9. A non-transitory computer-readable recording medium on which program for executing a method of providing matching information through sound information analysis in conjunction with a computing device, a user terminal, and a sensor is recorded, wherein the method comprises:

obtaining, by the user terminal, sound information;

generating, by the user terminal, a spectrogram or a mel-spectrogram of the sound information by analyzing of the sound information;

identifying, by the sensor that is located in a living space of a user, whether the user is located in a specific space that is the living space of the user, by recognizing radio waves transmitted from a radio-frequency identification (RFID) module of the user terminal;

identifying, by the computing device, whether the user is located in the specific space, based on sensing information received from the sensor;

in response to an identification that the user is located in the specific space, obtaining, by the computing device, the spectrogram or the mel-spectrogram of the sound information from the user terminal;

obtaining, by the computing device, user feature information, based on the spectrogram or the mel-spectrogram of the sound information; and providing, by the computing device, matching information corresponding to the user feature information, to one or more of the user terminals, wherein the matching information comprises user-specific advertisement information, wherein the providing of the matching information comprises:

generating an environmental feature table, based on one or more pieces of user feature information each corresponding to one of one or more pieces of the spectrogram or the mel-spectrogram of the sound information, that has been continuously obtained in the living space of the user in each time zone at intervals of a predetermined time period; and providing the matching information, based on the environmental feature table, wherein the environmental feature table comprises information on statistics of each piece of user feature information obtained at the intervals of the predetermined time period, and wherein the providing of the matching information further comprises:

identifying a first point in time for providing the matching information, based on the environmental feature table, wherein the first point in time is a time point when a specific activity is performed in each time zone, and the matching information includes the user-specific advertisement information related to the specific activity; and providing the matching information at the first point in time.

* * * * *